Z. CARTER.
Cotton-Seed Planters.

No. 145,554. Patented Dec. 16, 1873.

Witnesses: Inventor.

UNITED STATES PATENT OFFICE.

ZIMRI CARTER, OF LINE CREEK, SOUTH CAROLINA.

IMPROVEMENT IN COTTON-SEED PLANTERS.

Specification forming part of Letters Patent No. 145,554, dated December 16, 1873; application filed August 9, 1873.

*To all whom it may concern:*

Figure 1:
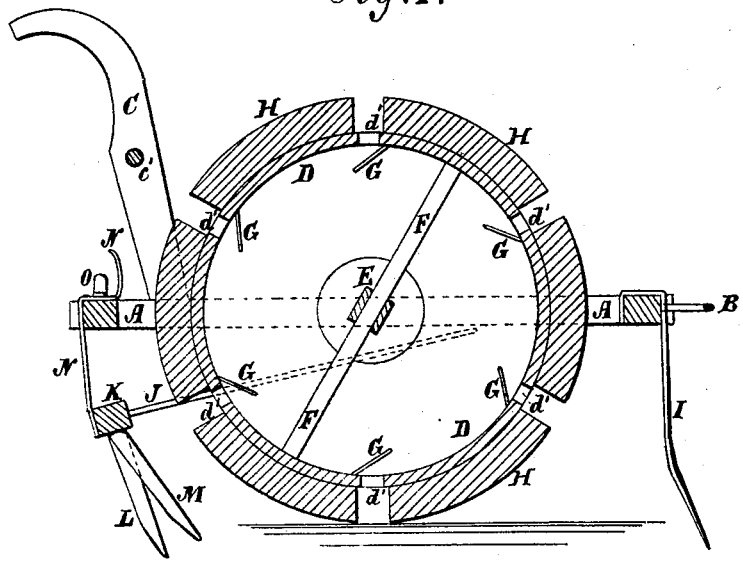
Figure 2:
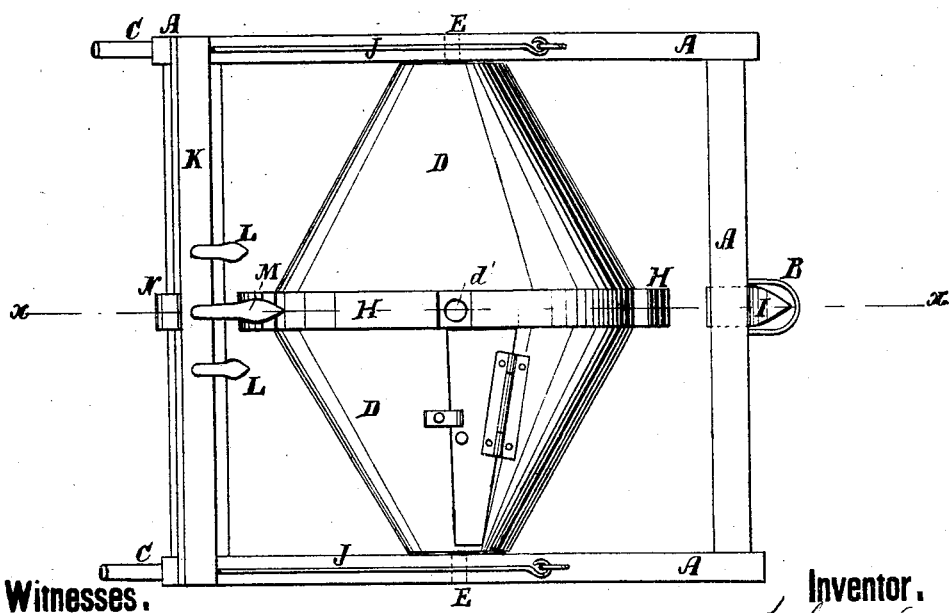

Be it known that I, ZIMRI CARTER, of Line Creek, in the county of Laurens and State of South Carolina, have invented a new and useful Improvement in Cotton-Seed Planters, of which the following is a specification:

Figure 1 is a vertical section of my improved planter, taken through the line $x\ x$, Fig. 2. Fig. 2 is a bottom view of the same.

Similar letters of reference indicate corresponding parts.

My invention is an improvement in the class of planters having a furrow-opening plow and covering devices arranged, respectively, in front and rear of a hopper, from which the seed is centrally discharged as the machine advances. The improvement relates to the arrangement of plows or shovels in rear of a centrally-discharging hopper, whereby one distributes or disperses the seed after being deposited in the furrow, and the others cover it, as hereinafter described.

A is a rectangular frame, consisting of two side bars, connected at their ends by two cross-bars. To the middle part of the front cross-bar of the frame A is attached a loop or hook, B, for the attachment of the draft. To the rear part of the side bars of the frame A are attached the handles C, which are connected and held in their proper relative position by a round, $c'$. D is the seed-reservoir, which is made in the form of two hollow cones, secured to each other at their bases. The seed-reservoir D is secured to the shaft E, which passes through its center, and the ends of which project and revolve in bearings attached to or formed in the middle parts of the side bars of the frame A. The seed-reservoir is strengthened by two or more radial arms, F, attached to the middle part of the shaft E, and the outer ends of which rest in the angle of said seed-reservoir. In the angle of the seed-reservoir D is formed a number of openings, $d^1$, to discharge the seed. To the inner surface of the reservoir D, just in front of the orifices $d^1$, are attached inclined fingers G, which detain the seed directly over said orifices until the reservoir comes into such a position that the seed will fall through the orifices. Around the center or angle of the reservoir D is formed, or to it is attached, a flange or rim, H, which is made in sections, or is notched transversely directly opposite the orifices $d^1$, as shown in Figs. 1 and 2. The rim H prevents the discharge-orifices from being clogged or choked by moist earth, and also, by rolling along the furrow, makes the draft less. To the middle part of the frame A is attached the plow I, by which the furrow is opened to receive the seed. To the lower side of the forward part of the side bars of the frame A are pivoted the forward ends of the rods J, to the rear ends of which are attached the ends of the cross-bar K, which crosses the machine a little in the rear of the seed-reservoir D. To the middle part of the cross-bar K are attached three plows, L M L. The central plow, M, is placed directly in the rear of the discharge-orifices of the reservoir D, projects in front of the side plows, L, and is designed to pass along the furrow and scatter the seeds as they drop and before they are covered, so that the planting may be done in drills. The plow M is detachable, so that it may be detached when the planting is to be done in hills. The side plows, L, enter the ground at the sides of the furrow, and a little in the rear of the plow M, so as to cover the seed. To the middle part of the cross-bar K is attached a strap, N, which has several holes formed in it to receive a pin, O, attached to the rear cross-bar of the frame A, so that the plows may be adjusted to enter the ground to any desired depth, or may be supported away from the ground. In the side of the reservoir D is formed a door, $d^2$, for the convenient insertion of the seed.

Having thus described my invention, I claim as new and desire to secure by Letters Patent—

The plows L and M, attached to the hinged or rising-and-falling bar K, the former arranged in rear of and laterally from the latter, in combination with the centrally-discharging hopper and the furrow-opener I, all as shown and described, whereby the seed is distributed in the furrow and then covered, as specified.

ZIMRI CARTER.

Witnesses:
W. F. MONROE,
J. D. SULLIVAN.